US005733587A

United States Patent [19]
Ream et al.

[11] Patent Number: 5,733,587
[45] Date of Patent: Mar. 31, 1998

[54] APPARATUS FOR FORMING MINIATURE SIZE CONFECTIONARY PRODUCTS

[75] Inventors: Ronald L. Ream, Plano; Christine Corriveau, Orland Park; Michael McHale, Aurora; Sharon Van Horn, Naperville, all of Ill.

[73] Assignee: the Wm. Wrigley Jr. Company, Chicago, Ill.

[21] Appl. No.: 685,276

[22] Filed: Jul. 23, 1996

Related U.S. Application Data

[63] Continuation of Ser. No. 208,459, Mar. 9, 1994, abandoned.
[51] Int. Cl.⁶ .................. B29C 43/52; B29B 13/04
[52] U.S. Cl. .................. 425/237; 425/144; 425/363; 425/395; 426/512; 426/517
[58] Field of Search .................. 425/96, 116, 144, 425/233, 237, 289, 333, 363, 378.1, 390, 395, DIG. 55; 426/319, 512, 517, 811

[56] References Cited

U.S. PATENT DOCUMENTS

| | | | |
|---|---|---|---|
| 1,164,718 | 12/1915 | Hill | 425/333 |
| 1,583,166 | 5/1926 | Pawlas | 425/116 |
| 1,915,528 | 6/1933 | Haug | 426/512 |
| 3,303,796 | 2/1967 | Novissimo | 426/512 |
| 3,727,308 | 4/1973 | Ross | 426/811 |
| 3,829,262 | 8/1974 | Aquarius | 425/233 |
| 3,859,407 | 1/1975 | Blanding et al. | 425/116 |
| 3,917,856 | 11/1975 | Wong et al. | 426/811 |
| 3,988,114 | 10/1976 | Gorin et al. | 425/333 |
| 4,817,517 | 4/1989 | Ammann et al. | 425/378.1 |
| 4,880,585 | 11/1989 | Klimesch et al. | 425/116 |
| 5,198,257 | 3/1993 | Heck et al. | 426/512 |
| 5,332,585 | 7/1994 | Obermatt et al. | 426/517 |
| 5,358,727 | 10/1994 | Yates et al. | 426/512 |

OTHER PUBLICATIONS

"Silicones Speed, Sanitize Processes", pp. 44–46,194, Jan. 1951 Issue of Food Industries.

"Silicones Stop Stick and Foam", pp. 52–54, Feb. 1956 Issue of Food Engineering.

*Primary Examiner*—C. Scott Bushey
*Attorney, Agent, or Firm*—Hill, Steadman & Simpson

[57] ABSTRACT

An apparatus is provided for forming miniature size confectionery products. A mass of a confectionery product, such as bubble gum, is formed into a thin, flat sheet. The flat sheet is then cooled and formed into a webbed mat having a plurality of desired configurations thereon. Next, the webbed mat is tumbled to break apart the webbed mat and form a plurality of miniature size confectionery products in the form of the desired configuration.

7 Claims, 3 Drawing Sheets

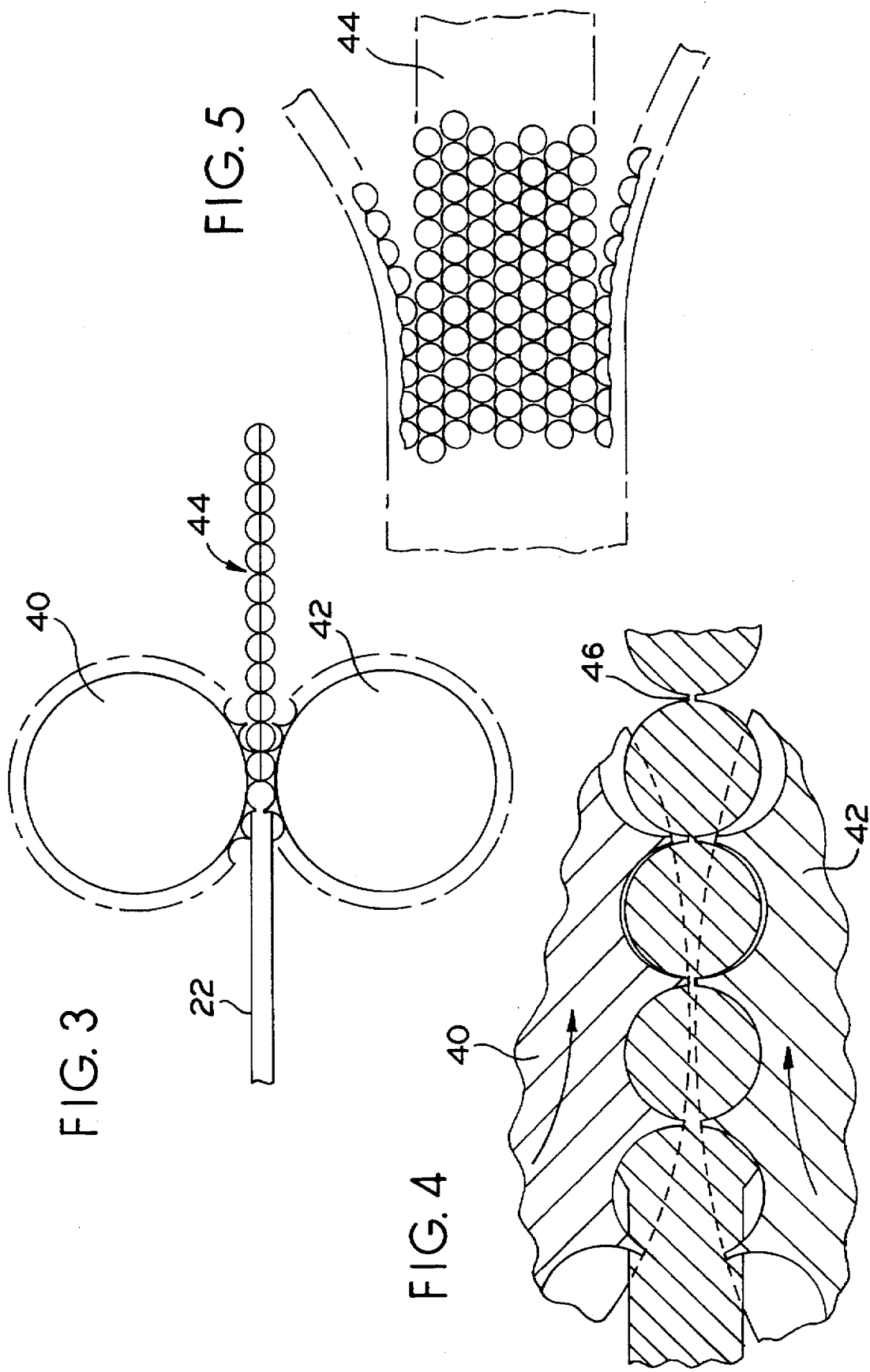

APPARATUS FOR FORMING MINIATURE SIZE CONFECTIONARY PRODUCTS

This is a continuation of application Ser. No. 08/208,459, filed Mar. 9, 1994 now abandoned.

BACKGROUND OF THE INVENTION

The present invention relates generally to the field of confectionery products. More specifically, the present invention relates to forming confectionery products into special shapes.

Confectionery products have been molded, extruded or otherwise shaped into various forms over the years. For example, bubble gum has been formed into shapes such as flat sticks, cylinders, cubes, cigars, shredded chew, and the like. Providing a confectionery product, such as bubble gum, in novel shapes or forms can lead to enhanced marketability of such a product, particularly with younger consumers.

An example of a traditional shape for chewing gum is the gum ball. For centuries, children as well as adults have enjoyed gum balls in a variety of flavors.

The process of forming gum balls from a mass of confectionery products is well known. Initially, a confectionery product coupled with an extruder forms the mass of confectionery product into ropes of gum. The ropes of gum are approximately ½ inches in diameter. Next, the ropes of gum are forced via centrifugal force through a plurality of spinning rods to form a multitude of individual gum balls. The individual gum balls are then sent through a cooling tunnel to harden. The resulting gum balls have a diameter of at least ½ inch.

While this conventional method produces satisfactory ½ inch gum balls, unfortunately, it cannot be used to produced smaller than ½ inch gum balls. Since continually changing the size and shape of confectionery products is desirable, a need exists for a method of forming miniature size confectionery products. For example, forming miniature size gum balls, as opposed to the traditional size gum balls, is a novel form that can ultimately lead to enhanced marketability of the bubble gum.

Unfortunately though, no practical methods of making such miniature size confectionery products are currently available. Because chewy gum is soft, flexible and tacky, the industry has thought that producing bubble gum in miniature sizes to be infeasible.

SUMMARY OF THE INVENTION

The present invention provides a method and apparatus for forming miniature size confectionery products. The method includes the following steps. Initially, a mass of confectionery product, such as bubble gum, is provided. This mass is then formed into a thin, flat sheet. The flat sheet is then cooled and ultimately formed into a webbed mat having a plurality of defined configurations thereon. Next, the webbed mat is tumbled to form a plurality of miniature size confectionery products in the form of the defined configuration.

In an embodiment, the confectionery product is chewing gum.

In an embodiment, the mass of confectionery product is formed into a thin, flat sheet having a thickness of approximately $^{50}/_{1000}$ inches to $^{400}/_{1000}$ inches.

In an embodiment, the method includes a step of cooling the flat sheet to a temperature in the range of approximately 50° F. to 85° F.

In addition, the present invention provides an apparatus for forming miniature size confectionery products. The apparatus includes means for forming a mass of confectionery product into a thin, flat sheet. In addition, the apparatus includes means for cooling the flat sheet and means for forming the flat sheet into a webbed mat having a plurality of defined configurations thereon. Still further, the system includes means for tumbling the webbed mat to break apart the webbed mat and form a plurality of miniature size confectionery products in the form of the defined configuration.

In an embodiment, the means for cooling the flat sheet is a cooling tunnel. In a preferred embodiment, the cooling tunnel cools the flat sheet to a temperature ranging from approximately 50° F. to 85° F.

In an embodiment, a forming device is used to form the flat sheet into a webbed mat. The forming device has forming rollers with a plurality of half-shaped moldings thereon. The forming rollers act in conjunction to form the defined configuration.

An advantage of the present invention is that it provides a method and apparatus for forming miniature size confectionery products that was previously thought infeasible.

Another advantage of the present invention is that it provides a unique engineering design for forming rollers that minimizes tackiness of a confectionery product.

Additional features and advantages of the present invention are described in, and will be apparent from, the drawings and the detailed description of the presently preferred embodiments.

BRIEF DESCRIPTION OF THE DRAWINGS

FIG. 3 is an enlarged side view of a portion of the forming rollers acting in conjunction to form miniature size confectionery products.

FIG. 4 is a side view illustrating the half moldings of the forming rollers.

FIG. 5 is a top view illustrating the webbed mat formed after the forming device acts on the thin, flat sheet of confectionery product.

DETAILED DESCRIPTION OF THE PRESENTLY PREFERRED EMBODIMENTS

The present invention provides a method and apparatus for forming miniature size confectionery products. While methods and apparatuses may exist for forming confectionery products into normal size shapes, the industry has failed to develop a method or apparatus for forming miniature size confectionery products. As used herein, the term confectionery product(s) is broadly used and refers to candies, including hard and chewing candy, chewing gums, and like products.

Figure 1:
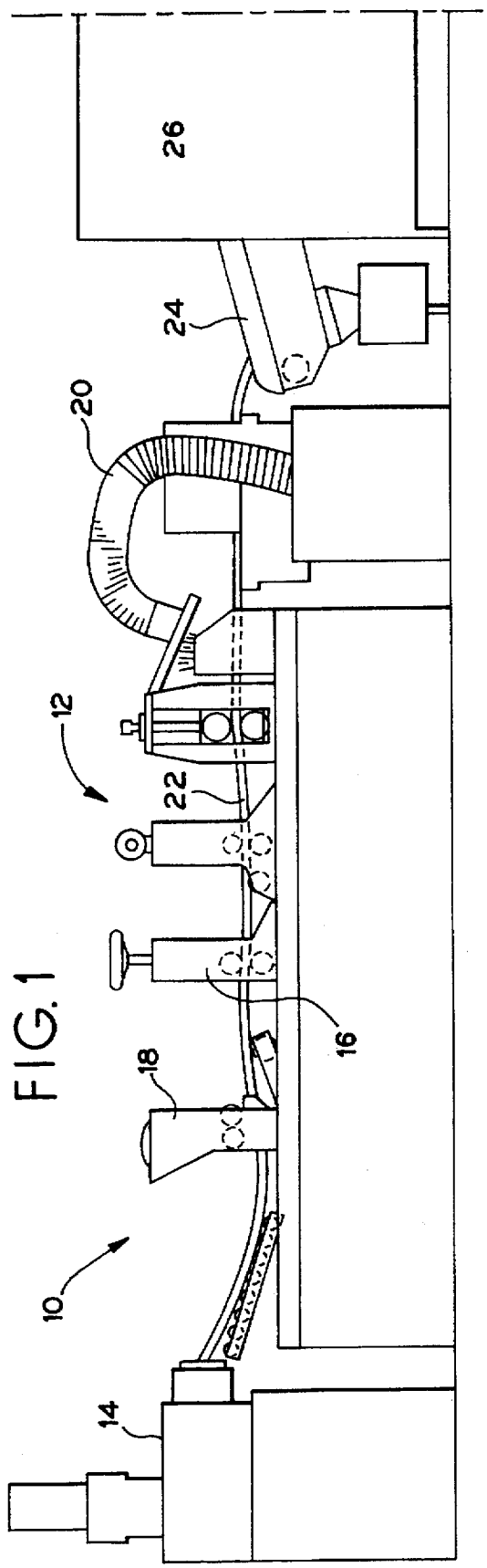
FIG. 1 is a side view of an embodiment of the present invention.
Figure 1:
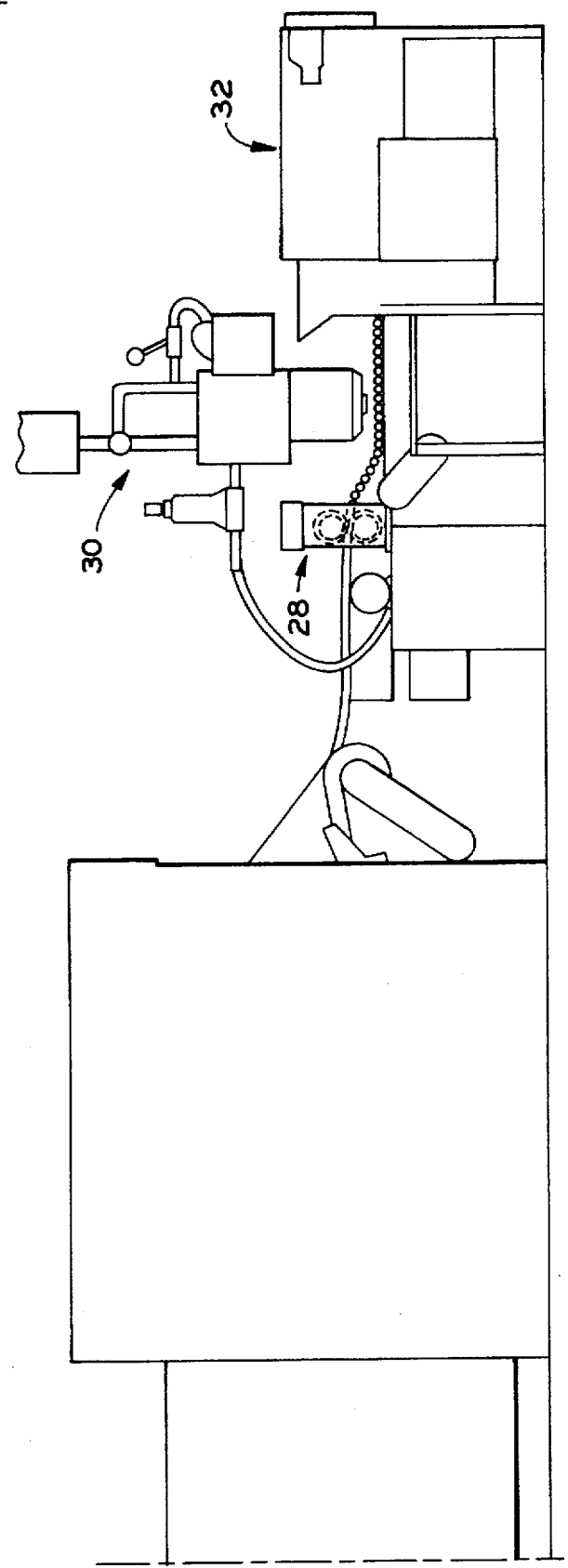

Referring now to the drawings, FIG. 1 illustrates one embodiment of the present invention. The apparatus 10 includes means 12 for forming a flat rectangular sheet of a confectionery product. In an embodiment, means 12 for forming a flat rectangular sheet of a confectionery product is a conventional chewing gum rolling machine. For example, a suitable rolling machine 12 that may be used in the present invention can be purchased from the Gimpel Manufacturing Company, WLS of West Germany. Naturally, other machines with the ability to roll or extrude a sheet of confectionery product can also be used.

The rolling machine 12 includes an extruder 14 into which a mass of the confectionery product is put. In an embodiment, the confectionery product is chewing gum. As set forth above, other confectionery products such as taffy, caramel, chewing candy, and the like can also be used.

A series of rollers 16 act on the mass of confectionery product to form a relatively thin, flat sheet 22. The rollers 16 size the thin, flat sheet 22 to a few thousandths of an inch larger than the desired configuration size. In an embodiment, the rollers 16 size the thin, flat sheet to a thickness ranging from approximately 75/100 inches to 609/1000 inches. Sizing the thin, flat sheet 22 to the desired thickness prevents sticking of the sheet 22 during formation of the miniature size confectionery products. In addition, a flat sheet 22 that is too thick exerts too much pressure on a forming device used to form the sheet 22 into the desired configurations.

The rolling machine 12 also includes a dusting apparatus 18 for dusting the sheet 22 in order to reduce any adhesiveness. Typically, starch may be used as the dusting compound.

The rolling machine 12 further includes a cleaner 20. The cleaner 20 removes excess dusting compound, such as cornstarch, from the thin, flat sheet 22. After the excess dusting compound is removed from the thin, flat sheet 22, the sheet 22 is carried on a conveyor belt 24 through a cooling tunnel 26.

The conveyor belt 24 carries the thin sheet of confectionery product 22 into the cooling tunnel 26. The cooling tunnel 26 cools the confectionery product so as to minimize tackiness and facilitate formation. In an embodiment, the cooling tunnel 26 cools the confectionery product to a temperature of approximately 50° F. to 85° F.

The ideal temperature of the cooling tunnel 26 depends upon the formulation of the confectionery product. Naturally, the formulation of the confectionery product effects the tackiness and ultimate formation of the desired configurations. If the temperature of the cooling tunnel 26 is too high, the confectionery product begins to stick. In contrast, if the temperature in the cooling tunnel 26 is too low, the confectionery product becomes too firm and will not form a uniform sheet having desired configurations thereon.

The ideal dwell time (speed of the conveyor belt 24) within the cooling tunnel 26 also depends upon the formulation of the confectionery product. In an embodiment, the cooling tunnel 26 has sixty-six feet of conveyor belt that carries the sheet 22 through the cooling tunnel 26. In an embodiment, the sheet 22 is maintained within the cooling tunnel for approximately one to three minutes.

Preferably, a base-tack free formula is used in the present invention. For example, a confectionery product, such as chewing gum, that may be utilized in the present invention is as follows:

| Ingredients | Percent | Pounds |
| --- | --- | --- |
| Sugar | 60.629 | 620.00 |
| Gum Base | 26.403 | 270.00 |
| Corn Syrup | 8.312 | 85.00 |
| Glycerine | 2.933 | 30.00 |
| Lecithin | 0.635 | 6.50 |
| Red Artificial Color (Red 40) | 0.410 | 4.20 |

-continued

| Ingredients | Percent | Pounds |
| --- | --- | --- |
| Art. Strawberry Flavor | 0.312 | 3.20 |
| Art. Strawberry Flavor | 0.312 | 3.20 |
| Carmine Red Color | 0.048 | 0.50 |
| Total Weight | | 1,022.60 |

After exiting the cooling tunnel 26, the thin, flat sheet of confectionery product 22 is passed through a forming device 28. The forming device 28 has a unique engineering design to minimize the tackiness of the confectionery product. For instance, the dual rollers used within the forming roller 28 are specially coated to reduce the tack of the confectionery product. A suitable coating that may be used in the present invention is a low temperature nitride coating. Such nitride coating is applied to the dual rollers with a conventional heat treating process.

In addition to the use of a cooling tunnel 26, the apparatus 10 utilizes a nitrogen system 30. The nitrogen system 30 is directly aligned over the forming device 28 such that the thin, flat sheet of confectionery product 22 is kept at a low temperature during formation of the desired configurations. The nitrogen system 30 cools the entire forming device 28, thereby also cooling the thin, flat sheet of confectionery product 22. As with the cooling tunnel 26, the ideal temperature of the nitrogen system 30 depends upon the formulation of the confectionery product. In an embodiment, the nitrogen system 30 is run at a temperature of approximately −30° F. to −100° F.

Figure 2:
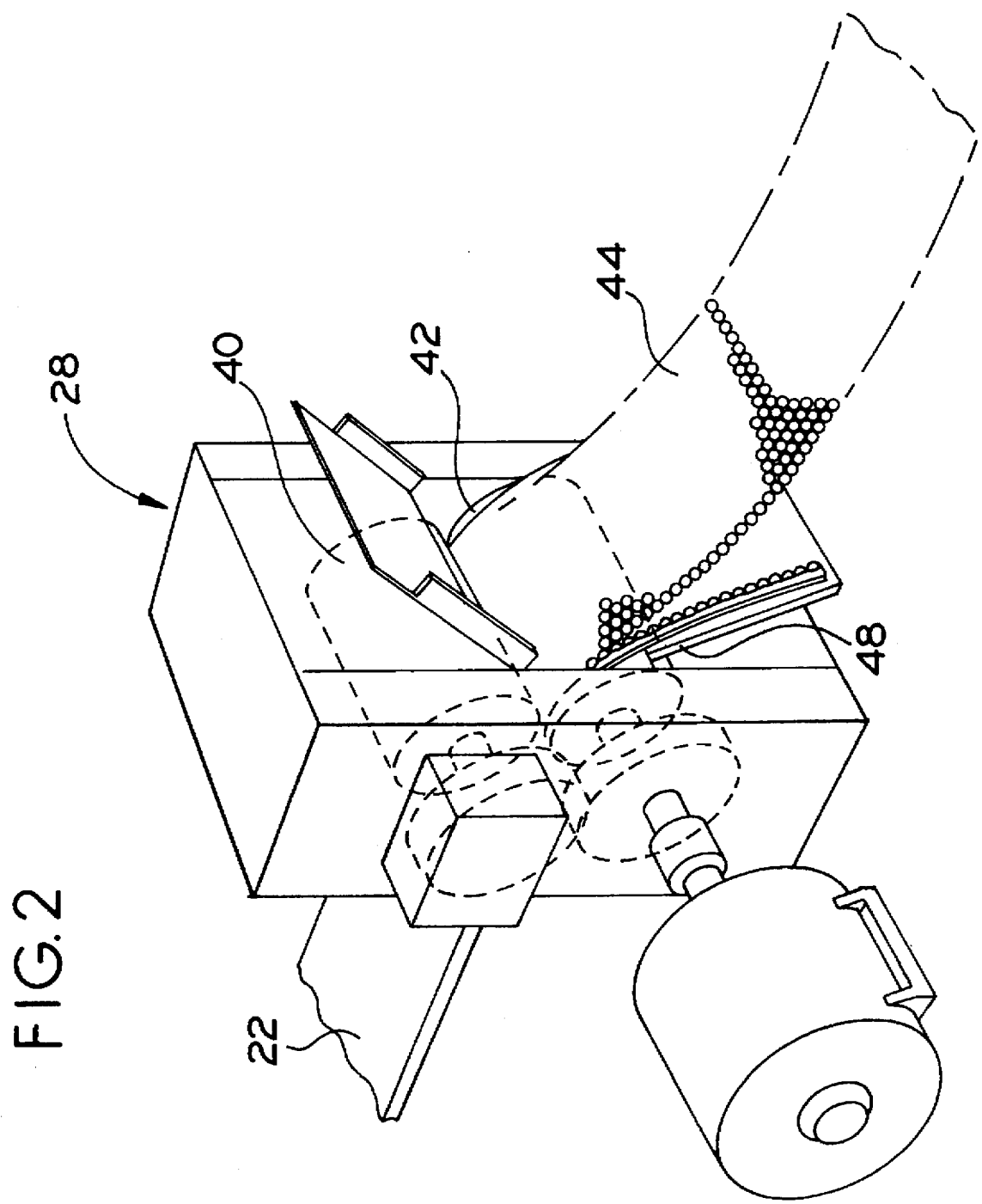
FIG. 2 is a perspective side view illustrating the forming device of the present invention.

FIG. 2 further illustrates the forming device 28 of the present invention. The forming device 28 includes at least two forming rollers 40, 42. The forming rollers 40, 42 act in conjunction with each other to form desired configurations on the thin, flat sheet 22. In a preferred embodiment, each of the respective forming rollers 40, 42 has an exterior surface with a plurality of hemisphere shaped moldings. In addition to the surface coating on the forming rollers 40, 42, the shape of these hemisphere moldings minimizes the tack of the confectionery product. Specifically, the hemisphere shaped moldings are constructed in such a manner so as to reduce the radius of same and thereby minimize sharp edges on same.

FIGS. 3 and 4 illustrate the forming rollers 40, 42 acting in conjunction to form a webbed mat 44. Naturally, the present invention is not limited to the formation of miniature size gum balls. Rather, a multitude of configurations fall within the scope of the present invention. For example, suitable forming rollers 40, 42 can be constructed so as to form triangles, diamonds, oval eggs and the like.

The positioning of the forming rollers 40, 42 in relation to each other serves an important role in the present invention. The forming rollers 40, 42 are positioned in such a way as to allow for the formation of a webbed mat 44. The webbed mat 44, as used in the present invention, refers to the formation of a plurality of desired configurations in the thin, flat sheet 22. The desired configurations are molded into the thin, flat sheet 22. The webbed mat 44 has a webbing of a defined thickness positioned in between the desired configurations so as to maintain a uniform sheet of confectionery product. Since the configurations are miniature in size, the thin webbing between the plurality of desired configurations prevents the individual configurations from sticking to the forming rolls 40, 42. Instead, the webbing interlocks the formed configurations together and thereby maintains the webbed mat 44 in a uniform sheet such that the entire webbed mat may be removed from the forming rollers 40, 42.

FIG. 4 is an enlarged view illustrating the formation of, in this embodiment, miniature size gum balls. As set forth above, the forming rollers 40, 42 do not unite when forming the miniature size gum balls. Instead, a spacing ranging from approximately 2/1000 inches to 4/1000 inches remains between the forming rollers 40, 42. The spacing between the forming rollers 40, 42 forms a webbing 46 between the multitude of miniature size gum balls. The webbing 46 has a thickness sufficient to hold the miniature size gum balls together, but not too thick so as to prevent the ultimate breaking apart of the webbed mat 44. In an embodiment, the webbing 46 ranges in thickness from approximately 2/1000 inches to 4/1000 inches.

The forming device 28 further includes a deflection shield 48. The deflection shield 48 cuts off scrappings as well as half configured moldings from the webbed mat 44. FIG. 5 illustrates the slicing off of the scrappings as well as half moldings from the webbed mat 44. Removing these scrappings from the webbed mat 44 increases the yield of formed miniature size gum balls. The scrappings sliced off from the webbed mat 44 can be collected and again sent through the apparatus 10.

As an alternative to a deflection shield 48, those skilled in the art will appreciate that other means exist for removing the scrappings from the webbed mat 44. For example, each of the forming rollers 40, 42 can be constructed so as to include a trimming edge (not shown) on the respective ends of each of the forming rollers 40, 42. The trimming edge will effectively cut off excess unformed confectionery product and result in a webbed mat 44 having a plurality of completely formed configurations thereon.

After the formation of the webbed mat 44, the conveyor belt 24 carries the webbed mat 44 into a drum roller 32. The drum roller 32 tumbles the webbed mat 44 to break apart same and form individual miniature size confectionery products. Once the webbed mat 44 is broken apart, repeated rolling of the drum roller 32 effectively smooths the webbing 46 into each individual miniature size confectionery product. The smooth miniature size confectionery products are then collected and placed in appropriate packaging.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. An apparatus for forming miniature size confectionery products comprising:

means for forming a mass of confectionery product into a sheet;

means for cooling the sheet to a temperature ranging from approximately 50° to 85° F.;

means for forming the sheet into a webbed mat having a plurality of desired configurations thereon, the means for cooling is positioned in the apparatus to cool the sheet prior to the sheet being formed into the webbed mat; and means for tumbling the webbed mat to break apart the webbed mat and form a plurality of miniature size confectionery products in the form of the desired configuration.

2. The apparatus of claim 1 wherein the means for cooling the sheet is a cooling tunnel.

3. The apparatus of claim 1 wherein the means for forming the sheet into a webbed mat is a forming device.

4. The apparatus of claim 3 wherein the forming device comprises at least two forming rollers with a plurality of half shaped moldings.

5. The apparatus of claim 1 further comprising means for simultaneously cooling the sheet and the means for forming the sheet as the sheet is being formed into the webbed mat.

6. The apparatus of claim 1 further comprising means for slicing off scrappings and half configured moldings from the webbed mat.

7. The apparatus of claim 5 wherein the means for cooling is a nitrogen system.

* * * * *